(12) United States Patent
Xing et al.

(10) Patent No.: US 10,291,575 B2
(45) Date of Patent: May 14, 2019

(54) DYNAMIC AUTHORIZATION USING INTERNET-BASED SOCIAL NETWORKS

(71) Applicant: Microsoft Technology Licensing, LLC, Redmond, WA (US)

(72) Inventors: Bo Xing, Fremont, CA (US);
Kuldipsinh Rana, Dublin, CA (US);
Yogesh Upadhyay, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/350,945

(22) Filed: Nov. 14, 2016

(65) Prior Publication Data

US 2018/0139165 A1    May 17, 2018

(51) Int. Cl.
| | |
|---|---|
| H04L 12/58 | (2006.01) |
| H04L 29/06 | (2006.01) |
| H04W 4/12 | (2009.01) |
| G06Q 50/00 | (2012.01) |
| G06Q 10/10 | (2012.01) |

(52) U.S. Cl.
CPC ............ *H04L 51/32* (2013.01); *H04L 51/24* (2013.01); *H04L 51/30* (2013.01); *H04L 63/08* (2013.01); *G06Q 10/107* (2013.01); *G06Q 50/01* (2013.01); *H04W 4/12* (2013.01)

(58) Field of Classification Search
CPC ....... G06Q 50/01; H04L 12/588; H04L 51/32; H04W 4/21
See application file for complete search history.

(56) References Cited

U.S. PATENT DOCUMENTS

| | | | | |
|---|---|---|---|---|
| 8,898,226 B2* | 11/2014 | Tiu, Jr. | ............... | G06F 17/3089 709/203 |
| 9,426,143 B2* | 8/2016 | Patel | ................... | H04L 63/0815 |
| 9,491,148 B2* | 11/2016 | Passichenko | ....... | H04L 63/0428 |
| 9,508,239 B1* | 11/2016 | Harrison | ............ | G08B 13/2462 |
| 9,723,038 B2* | 8/2017 | Corbin | ................ | H04L 65/403 |
| 10,043,332 B2* | 8/2018 | Scalisi | ............... | G06Q 10/0833 |
| 2010/0132049 A1* | 5/2010 | Vernal | ................. | G06F 21/6245 726/27 |
| 2011/0314115 A1* | 12/2011 | Nagaraj | ............. | G06Q 10/1095 709/206 |
| 2012/0191606 A1* | 7/2012 | Milne | .................. | G06Q 10/101 705/44 |
| 2014/0006977 A1* | 1/2014 | Adams | .................... | H04L 51/32 715/758 |
| 2014/0136346 A1* | 5/2014 | Teso | ........................ | G06O 30/06 705/14.72 |
| 2015/0120429 A1* | 4/2015 | Salmon | .............. | G06Q 30/0233 705/14.33 |
| 2017/0085843 A1* | 3/2017 | Scalisi | ................ | G08B 13/248 |
| 2018/0061164 A1* | 3/2018 | Scalisi | ............... | G06Q 10/0833 |

* cited by examiner

*Primary Examiner* — Arvin Eskandarnia
(74) *Attorney, Agent, or Firm* — Schwegman Lundberg & Woessner, P.A.

(57) ABSTRACT

Among other things, embodiments of the present disclosure discussed herein may be used to facilitate the authorization of services between service providers and other users (e.g. customers of the service provider) with accounts on a social network. Unlike conventional authorization systems, embodiments of the present disclosure allow authorizations to occur dynamically at any time, regardless of the physical locations of the service provider and the customer. Embodiments of the present disclosure can also provide service providers and customers information on authorization requests on demand.

20 Claims, 5 Drawing Sheets

DYNAMIC AUTHORIZATION USING INTERNET-BASED SOCIAL NETWORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

An Internet-based social networking service is a web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information.

For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes may be referred to as "business networks" or "professional networks").

Online social network platforms (also referred to herein as Internet-based social networks) provide a variety of information and content to users of the social network, such as articles on various topics, updates related to a user and individuals within the user's network, job opportunities and other advertisements, news stories, and the like. Among other things, embodiments of the present disclosure allow service providers with accounts on a social network to obtain authorization to provide services from other users with accounts on the online social network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the embodiments in the present disclosure are not limited to a social or business networking service.

Among other things, embodiments of the present disclosure discussed herein may be used to facilitate the authorization of services between service providers and other users (e.g. customers of the service provider) with accounts on a social network. Unlike conventional authorization systems, embodiments of the present disclosure allow authorizations to occur dynamically at any time, regardless of the physical locations of the service provider and the customer. Embodiments of the present disclosure can also provide service providers and customers information on authorization requests on demand.

Figure 1:
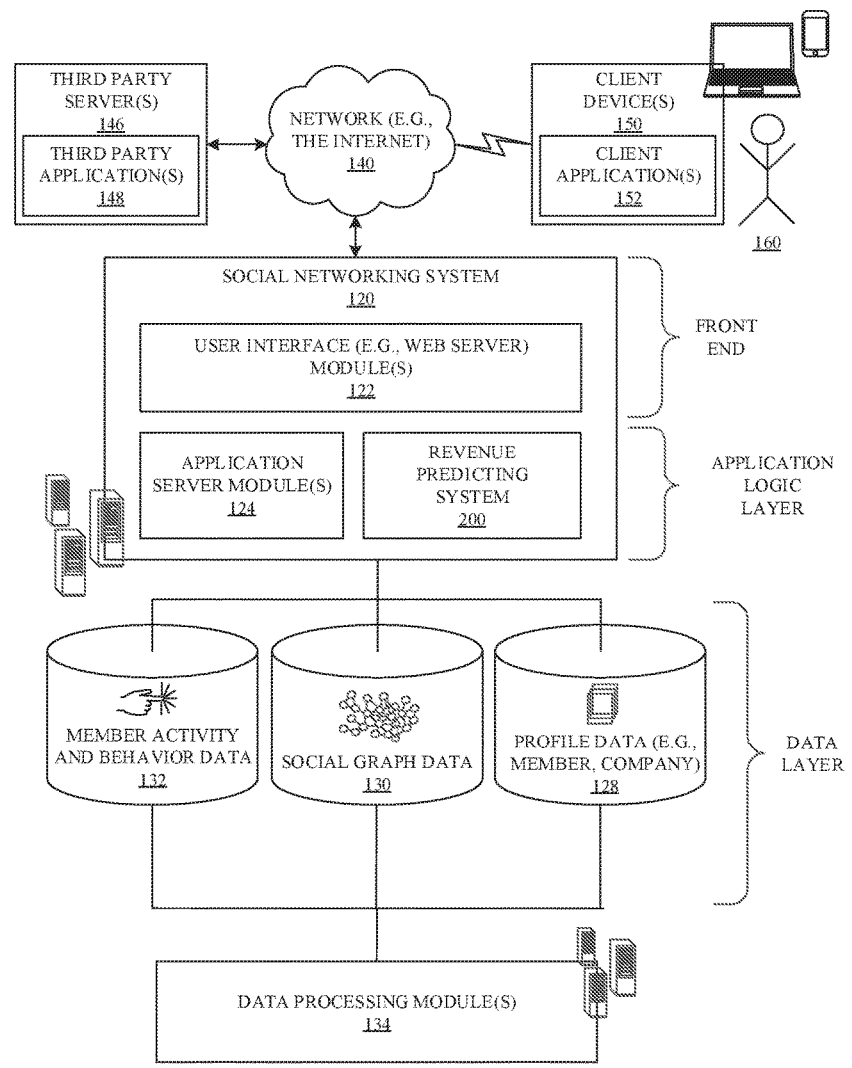
FIG. 1 is a block diagram illustrating a client-server system, according to various exemplary embodiments.

FIG. 1 illustrates an exemplary client-server system that may be used in conjunction with various embodiments of the present disclosure. The social networking system 120 may be based on a three-tiered architecture, including (for example) a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. Various additional functional modules and engines may be used with the social networking system illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the embodiments of the present disclosure are not limited to such architecture.

As shown in FIG. 1, the front end layer consists of a user interface module(s) (e.g., a web server) 122, which receives content requests from various computing devices including one or more user computing device(s) 150, and communicates appropriate responses to the requesting device. For example, the user interface module(s) 122 may receive requests in the form of Hypertext Transport Protocol (HTTP) requests, or other web-based, application programming interface (API) requests. The user device(s) 150 may be executing conventional web browser applications and/or applications (also referred to as "apps") that have been developed for a specific platform to include any of a wide variety of mobile computing devices and mobile-specific operating systems.

For example, user device(s) 150 may be executing user application(s) 152. The user application(s) 152 may provide functionality to present information to the user and communicate via the network 140 to exchange information with the social networking system 120. Each of the user devices 150 may comprise a computing device that includes at least a display and communication capabilities with the network 140 to access the social networking system 120. The user devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other entity interacting with the client device(s) 150. The user(s) 160 may interact with the social networking system 120 via the user device(s) 150. The user(s) 160 may not be part of the networked environment, but may be associated with user device(s) 150.

For example, some users of the social network may include individuals, companies, or other entities that sells a product or provides a service, collectively referred to herein as "service providers." Any number and type of different client devices 150 may be associated with a service provider. For example, a service provider who provides package delivery services may have one or more server systems communicating with handheld computing devices (e.g., tablet computers) carried by individual delivery personnel. Likewise, users (e.g., customers) for whom a service provider provides a service using embodiments of the present disclosure may communicate with the social networking system 120 or the computing device(s) of the service provider using any number and type of different computing devices, such as by using a smartphone or other mobile device.

As shown in FIG. 1, the data layer includes several databases, including a database 128 for storing data for various entities of a social graph. In some exemplary embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

In some embodiments, when a user initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service, A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some exemplary embodiments, members may receive advertising targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

Further, as shown in FIG. 1, a data processing module 134 may be used with a variety of applications, services, and features of the social networking system 120. The data processing module 134 may periodically access one or more of the databases 128, 130, and/or 132, process (e.g., execute batch process jobs to analyze or mine) profile data, social graph data, member activity and behavior data, and generate analysis results based on the analysis of the respective data. The data processing module 134 may operate offline. According to some exemplary embodiments, the data processing module 134 operates as part of the social networking system 120. Consistent with other exemplary embodiments, the data processing module 134 operates in a separate system external to the social networking system 120. In some exemplary embodiments, the data processing module 134 may include multiple servers of a large-scale distributed storage and processing framework, such as Hadoop servers, for processing large data sets. The data processing module 134 may process data in real time, according to a schedule, automatically, or on demand. In some embodiments, the data processing module 134 may perform (alone or in conjunction with other components or systems) the functionality of method 200 depicted in FIG. 2 and described in more detail below.

Additionally, a third party application(s) 148, executing on a third party server(s) 146, is shown as being communicatively coupled to the social networking system 120 and the user device(s) 150. The third party server(s) 146 may support one or more features or functions on a website hosted by the third party.

Figure 2A:
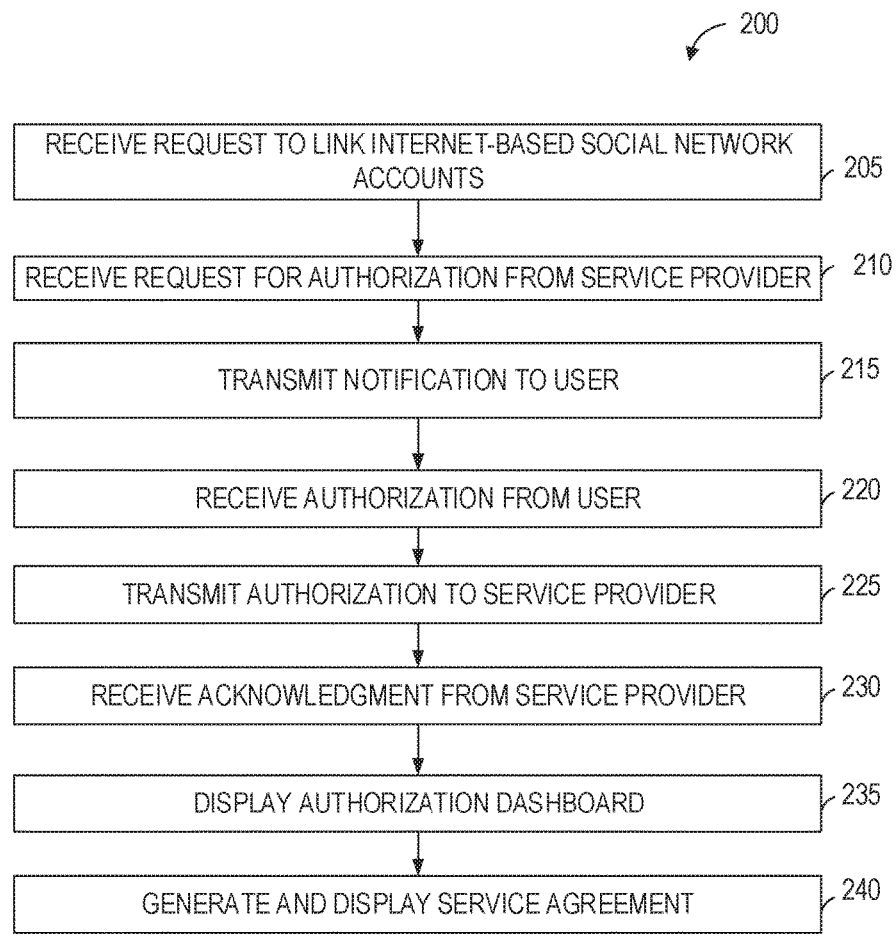
FIG. 2A is a flow diagram of a method according to various exemplary embodiments.

FIG. 2 illustrates an exemplary method 200 for monitoring and enforcing compliance of a member of an online social network according to various aspects of the present disclosure. Embodiments of the present disclosure may practice the steps of method 200 in whole or in part, and in conjunction with any other desired systems and methods. The functionality of method 200 may be performed, for example, using any combination of the systems depicted in FIGS. 1, 3, and/or 4.

In this example, method 200 includes receiving a request to link accounts between a service provider and another user on an online social network (205), receiving a request for authorization to provide a service for the user by the service provider (210), transmitting a notification to the user (215), receiving authorization for the service by the user (220), transmitting authorization to perform the service to the service provider (225), and receiving acknowledgment from the service provider (230). Method 200 further includes displaying an authorization dashboard to the user and/or service provider (235) and generating and displaying a service agreement (240).

Embodiments of the present disclosure may receive a request to link the accounts of service providers and users (205) on the online/Internet-based social network in a variety of different ways. For example, referring to FIG. 1, a service provider may transmit (using the service provider's client computing device 150) the request in an electronic communication over the Internet or other network 140 to social networking system 120. Alternatively, the request may be received (205) from the computing device 150 of a user who uses (or may use in the future) the services of the service provider. The system may require approval from both parties prior to linking the accounts.

In some embodiments, the service provider may not necessarily have an account with the social network, in which case the system simply links the service provider (e.g., via a computing device controlled by the service provider) to an authorization page of the user of the social network for the purpose of allowing the user to authorize a particular service. As an example, consider package delivery services. For a package that requires the recipient's signature for delivery, a service provider is unable to deliver the package if the recipient is not physically present. The delivery person cannot leave the package at the front door or in the backyard without permission. This hurts customer experience as the recipient may expect to receive the package as soon as possible but has not been tracking it. It also adds to the operation cost of the delivery service, because the trip to the recipient's place was wasted and additional delivery attempts will have to be made. In this example, embodiments of the present disclosure help address these issues by allowing the user to authorize the service provider to perform the service remotely.

For example, where the service provider seeks to deliver a package to the user, the user could provide the service provider with a quick response (QR) code (e.g., on the door of the user's house when the service provider arrives to deliver the package) that the service provider scans to generate a request to link the service provider with the user (205) via the authorization request page on the user's social network account.

In method 200, the system receives a request for authorization from a service provider (210) to provide a service for a customer/user whose account on the online social network is linked to the service provider (e.g., directly linked as described above or linked via the accounts of the service provider and the user on the social network). The request for authorization may be included in an electronic communication transmitted from the client computing device 150 of the service provider, and may include any desired information, including identification of the service provider, identification of the user for whom authorization is requested, identification of the object of the authorization (e.g., authorization to deliver a package, pick up a document, etc.), and other information.

Embodiments of the present disclosure may also apply to other services, as well as arrangements between two users on the online social network. For example, the system can facilitate authorizations for users to park in the private parking spaces of other users, or to allow a cleaning service temporary access to a user's home or office (e.g., via a code to an electronic locking system that is valid for a predetermined period of time).

In one exemplary embodiment, a user who is part of a neighborhood watch could provide temporary online access to his or her security cameras to another member of the neighborhood watch via the users' respective accounts on the online social network. Access could be granted for a predetermined period of time in the same manner a service provider can request authorization to perform a service within a predetermined period of time as described in more detail below.

In some embodiments, the request may include a predetermined time period in which the request for authorization is valid, and the request becomes invalid if the customer does not respond by then. In the package delivery example from above, the request could be issued when the delivery person leaves the business facility/warehouse or approaches or arrives at the delivery location for the user. The period of validity of the authorization request could thus vary in different cases. In cases where this authorization time limit is present, the system transmits the authorization to perform the service (225) to the computing device of the service provider in response to receiving the authorization from the user (220) within the predetermined time period, otherwise the request becomes invalid. The request may include additional parameters and information, such as a request for the authorization of multiple different services. In such cases, each individual authorization may have its own predetermined expiration period.

The system transmits a notification to the computing device of the user (e.g., in an electronic communication transmitted over the Internet) notifying the user of the request for authorization received (210) from the service provider. In some embodiments, an electronic communication containing the notification includes a link that, when selected by the user/customer, takes the customer to an authorization page hosted by the online social network 120 where the user may enter selections to authorize the service. In alternate embodiments, the body of the communication (e.g., an email) itself displays the authorization page and the user can authorize or decline the service based on the user's response to the communication.

The system receives an electronic communication from the computing device of the user containing authorization from the user to perform the service (220). In one embodiment, for example, the user/customer may be provided an authorization notification that includes the identify of the service provider, the service for which authorization is requested, the time the request is valid, etc. The user may be provided buttons or links within the communication such as an "Authorize" button to authorize and a "Decline" button to decline authorization. Selection of the buttons may initiate an electronic communication in the form of the invocation of APIs exposed by the social network system 120 to update the state of the authorization, and data written to the appropriate database.

In response to receiving authorization from the user for the service, the system transmits an electronic communication to the computing device of the service provider (225) giving authorization for the service provider to provide the service. The service provider may, in turn, provide acknowledgment (230) of the authorization via an electronic communication back the social network system 120). The service provider may then provide the service to the user/customer. In the package delivery service example, the delivery person (now having verified authorization from the user to do so) can leave a package at the user's delivery address just as if the user were present to sign for the package.

The request to link accounts (205), request for authorization (210), notification to the user (215), authorization from the user (220), authorization transmitted to the service provider (225), acknowledgment from the service provider (230) and other communications transmitted between the online social network system 120, client devices 150, and other devices, may be included in any number of different electronic communications. In this context, an "electronic communication" may include any electronic transmission of data, including data exchanged via an application programming interface (API) exposed by the social network system 120, client devices 150, and/or other devices. In some embodiments, an electronic communication may include, for example: a mobile push notification, a text message, an email, an Internet Relay Chat (IRC) message, an API call, transmission of a data packet (e.g., encrypted), information displayed and/or entered via a web interface, as well as any another suitable form of electronic communication. Electronic communications used by embodiments of the present disclosure may be transmitted over the Internet or another network 140 and may be in any format and use any type of communication protocol.

For example, in some embodiments, the electronic communications associated with steps 205-230 may be transmitted and received via the internal messaging system of the online social network. Among other things, this can help maintain the privacy of customers by utilizing contact information (such as the user's public social network profile information) to facilitate contact between the user and a service provider instead of the user's personal email address or other private information.

Referring again to FIG. 2, the system may display an authorization dashboard (235) to provide information regarding authorizations involving any service provider or customer. In one exemplary embodiment, the system may control the user's computing device and/or service provider's computing device to display the authorization dashboard. The system may first request authorization from the owner of the controlled computing device and can control the computing device using calls to API functions exposed by the controlled computing device, as well as by activating one or more software applications residing on the controlled device.

Figure 2B:
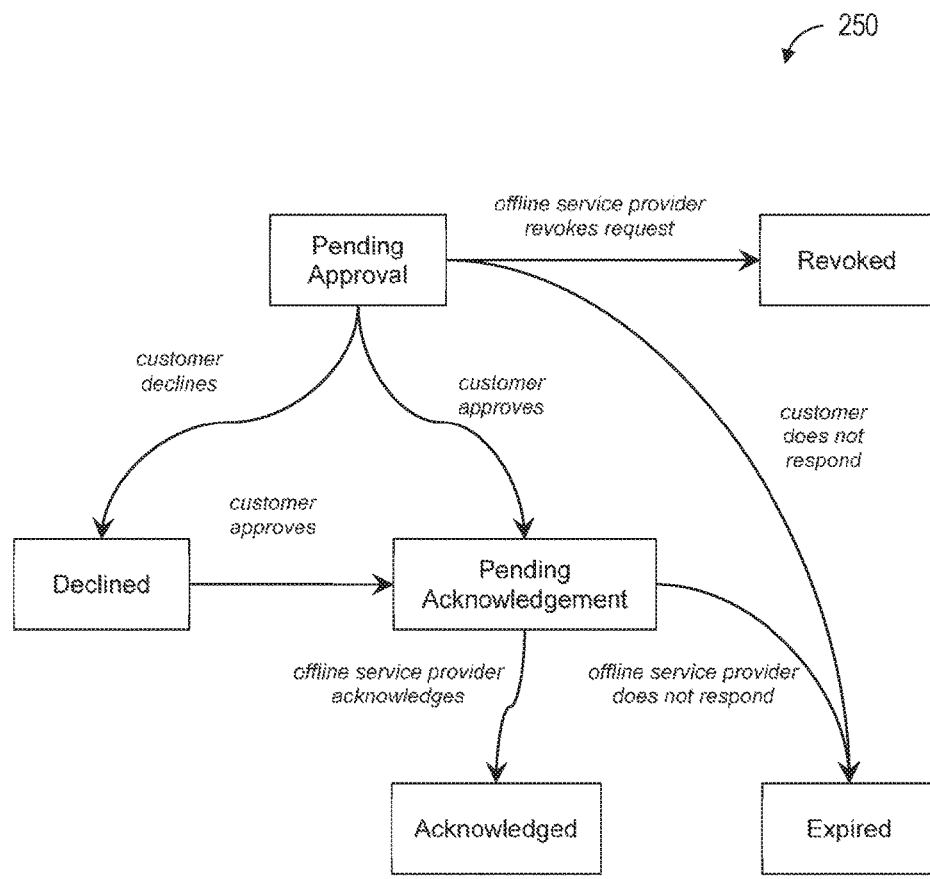
FIG. 2B is a state diagram illustrating the transitions between the states of authorization requests according to various exemplary embodiments.

The authorization dashboard may include a variety of information regarding authorizations involving a service provider, customer, or other party. For example, the authorization dashboard may include a list of authorization requests that are awaiting the customer's approval, a list of authorization requests for which the customer has declined authorization, a list of authorization requests awaiting acknowledgment by the service provider, a list of expired authorization requests, and/or a list of revoked authorization requests. Some exemplary states authorization requests, and the transitions between the states, are depicted in FIG. 2B. Alternate embodiments may use additional, fewer, or different states. An authorization dashboard displayed in conjunction with the embodiments of the present disclosure may present information regarding authorization requests and their states in any desired manner. The dashboard may be displayed to a customer, a service provider, or another party, and allow various actors to modify the state of requests as described below, such as by making selections to a graphical user interface displaying the authorization dashboard (e.g., by clicking "approve," "decline," and other buttons displayed in conjunction with the information for the request).

In the example in FIG. 2B, "pending approval" authorization requests are outstanding authorization requests that are awaiting the customer's approval and have not passed their expiration time. The customer can choose to approve an authorization in this state, in which case the request transitions to the "pending acknowledgement" state. Alternatively, the customer can choose to decline an authorization, in which case the request transitions to the "declined" state. From the service provider's perspective, the service provider can revoke requests not yet authorized by the customer, thereby changing the state of the request to "revoked."

The "declined" authorization requests in FIG. 2B are authorization requests that the customer have declined, or earlier approved and then revoked. In some embodiments, this may include all requests that are declined/revoked, or only requests that that are declined/revoked but have not yet passed their expiration time. In cases where the time to authorize a request has not yet expired, the customer can choose to approve an authorization in this state, in which case the authorization transitions to the "pending acknowledgement" state.

The "pending acknowledgement" state refers to authorization requests that have been authorized by the customer but not yet acknowledged by the service provider. In some embodiments, the customer can choose to revoke an authorization in this state, in which case the acknowledgment transitions to the "declined" state. The service provider can choose to acknowledge such an authorization, in which case the authorization change to the "acknowledged" state.

The "acknowledged" requests are requests that have been both authorized by the user and acknowledged by the service provider. In this example, acknowledgment by the service provider may refer to a service being performed or performance of the service beginning, thereby foreclosing any further opportunity by the customer to revoke authorization. In other embodiments, the system may allow the customer to decline or revoke a service even after acknowledged by the service provider.

The "expired" requests are authorization requests that have passed their expiration time, and were pending approval or pending acknowledgement at the time they expired. The "revoked" requests are authorization requests that were earlier issued but then revoked by service providers. In this example, no further state transitions/actions are available for expired or revoked requests. In other embodiments, it may be possible for the system to allow customers and service providers to revive expired or revoked requests. For example, a service provider could extend the period of time initially given for authorization of a request to revive an expired timer.

In some embodiments, the system can generate a service agreement between a service provider and a user. In some embodiments, the service agreement is generated by the system in response to receiving the request for authorization from the service provider and authorization from the user for the service provider to perform the service. Generation of the service agreement may also be predicated upon the service provider providing acknowledgment (230). The system may either transmit the service agreement to the computing devices of the service provider and/or user, or control either or both devices e.g. over the Internet as described above for step 235) to display the service agreement.

Embodiments of the present disclosure may utilize a combination of different hardware and software components to implement the functionality of the embodiments described herein. For example, the social networking system 120 may include (or interface with) one or more authorization servers that that expose application program interfaces (APIs), such as HTTP REST APIs, for managing authorizations, including creating new authorization requests, updating the status of authorization requests, retrieving the details of authorization requests, etc. The authorization server(s) may interact one or more databases (e.g., databases 128, 130, 132) to read and write data regarding authorizations such as data regarding the requester (e.g., a service provider), the owner (e.g., a customer), the object of the authorization (e.g., what is authorized), the state of the authorization, the expiration time period for an authorization, and any actions that have been taken regarding the authorization (creation, updates, state change, etc.), including when and by whom.

The social networking system 120 may also include (or interface with) one or more frontend servers which render user-interfacing pages to service providers and customers on web browsers of their respective computing devices. These pages may include, for example: (1) a page for a service provider to initiate an authorization request; (2) a page for customers to give authorization/consent for the provider to perform the service; and/or (3) an authorization dashboard page for customers and service providers to view the list of incoming and outgoing authorizations and act on them. The frontend servers may call the APIs exposed by the authorization servers for filling the content of the pages rendered, and for updating persisted data when actions are taken by users.

The social networking system may further include (or interface with) one or more notification servers that handle the generation of notifications and electronic communications on multiple channels based on recipients' preferences, and pushes them out. The notification servers may utilize, or operate in conjunction with, a variety of communication technologies, including SMTP servers, the APPLE PUSH NOTIFICATION SERVICE, GOOGLE CLOUD MESSAGING SYSTEM, and other communication formats and protocols.

Figure 3:
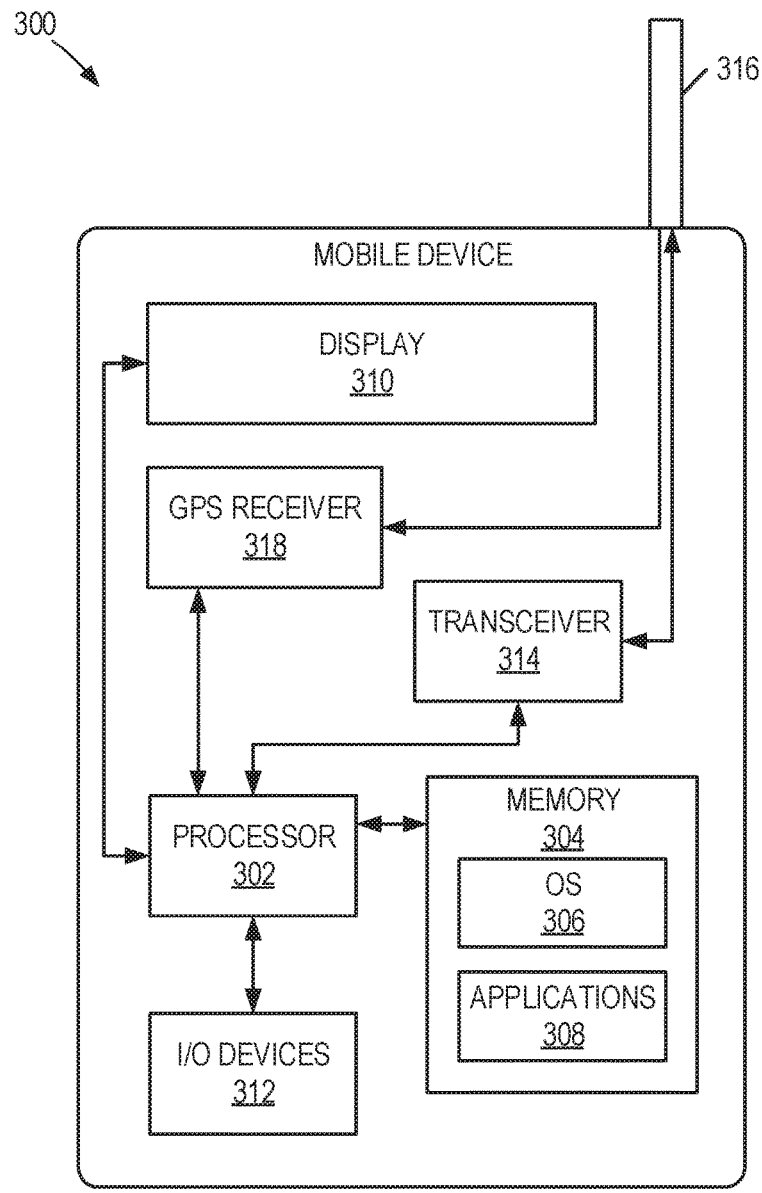
FIG. 3 is a block diagram illustrating an exemplary mobile device.

FIG. 3 is a block diagram illustrating a mobile device 300, according to an exemplary embodiment. The mobile device 300 may be (or include) a client device 150 (in FIG. 1) or any other device operating in conjunction with embodiments of the present disclosure. The mobile device 300 may include a processor 302. The processor 302 may be any of a variety of different types of commercially available processors 302 suitable for mobile devices 300 (for example, an XScale architecture microprocessor, a microprocessor without interlocked pipeline stages (MIPS) architecture processor, or another type of processor 302). A memory 304, such as a random access memory (RAM), a flash memory, or other type of memory, is typically accessible to the processor 302. The memory 304 may be adapted to store an operating system (OS) 306, as well as application programs 308, such as a mobile location enabled application that may provide LBSs to a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 may be coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a GPS receiver 318 may also make use of the antenna 316 to receive GPS signals.

Certain embodiments may be described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In exemplary embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some exemplary embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Exemplary embodiments may be implemented in digital electronic circuitry, or in computer hardware, firmware, software, or in combinations of them. Exemplary embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In exemplary embodiments, operations may be performed by one or more programmable processors executing a computer program to perform functions by operating on input data and generating output. Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 4:
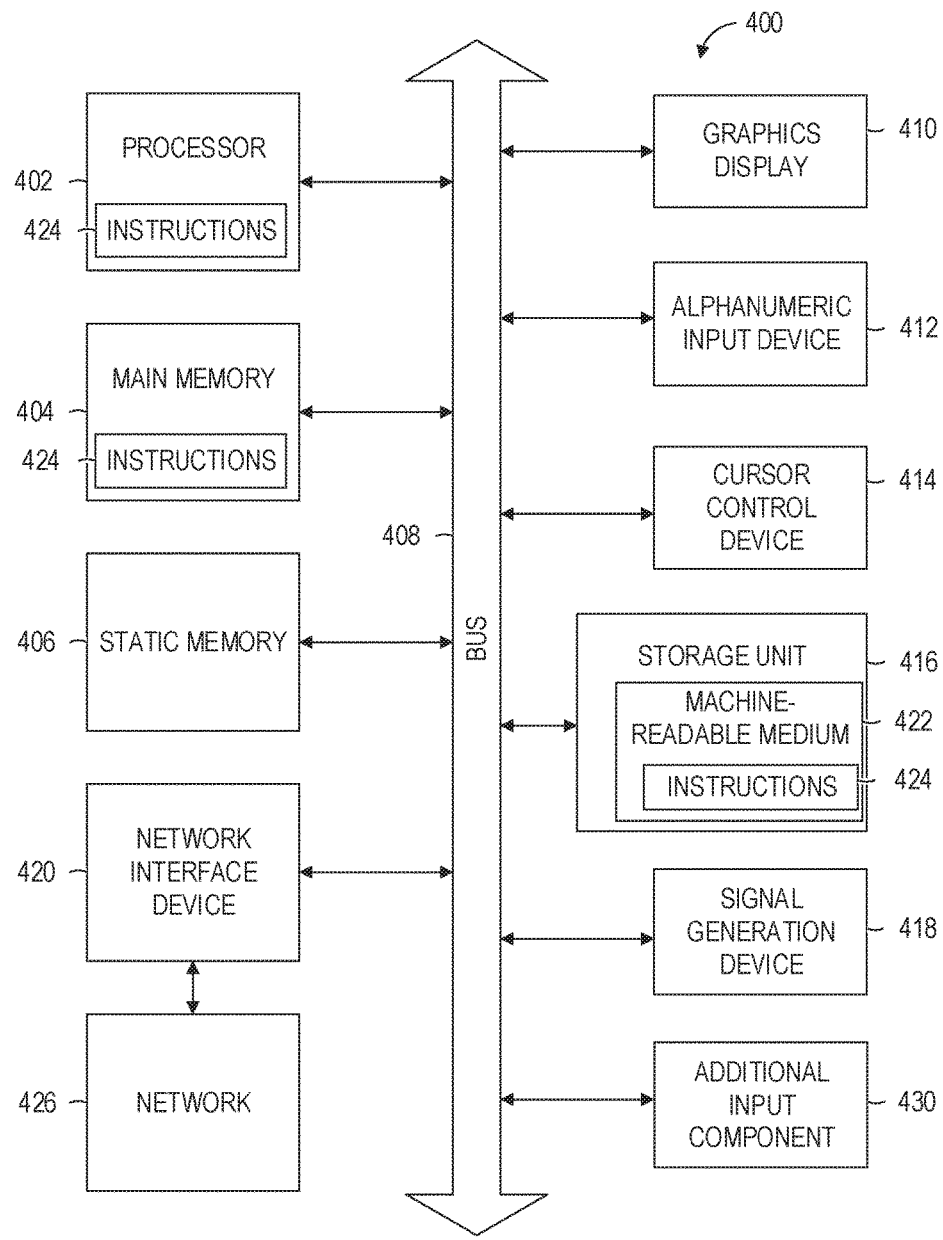
FIG. 4 is a block diagram illustrating components of an exemplary computer system.

FIG. 4 is a block diagram illustrating components of a machine 400, according to some exemplary embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system within which the instructions 424 (e.g., software, a program, an application, an applet, or other executable code) for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 426 via the network interface device 420. For example, the network interface device 420 may communicate the instructions 424 using any one or more transfer protocols (e.g., hypertext transfer protocol (HTTP)).

In some exemplary embodiments, the machine 400 may be a portable computing device, such as a smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an exemplary embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A method comprising:
 receiving, over the Internet by a computer system from a computing device of a user of an Internet-based social network, an electronic communication containing a request to link an account of the user on the Internet-based social network with an account of an offline service provider on the Internet-based online social network;
 receiving, over the Internet by the computer system from a computing device of the offline service provider, an electronic communication containing a request for authorization to perform a service for the user by the offline service provider, the request for authorization to perform a service for the user by the offline service provider including an expiration time after which a user will be unable to authorize the service;
 transmitting, over the Internet by the computer system to the computing device of the user, an electronic communication containing a notification of the request for authorization, the notification of the request for authorization including a link that, when clicked, causes a graphical user interface operated by the user to navigate to an authorization web page operated by the offline service provider;
 receiving, over the Internet by the computer system from the computing device of the user, an electronic communication containing authorization from the user for the offline service provider to perform the service; and
 transmitting, over the Internet by the computer system to the computing device of the offline service provider, an electronic communication containing authorization to perform the service for the user.

2. The method of claim 1, further comprising receiving, over the Internet by the computer system from the computing device of the service provider, an electronic communication containing an acknowledgment of the authorization to perform the service.

3. The method of claim 1, wherein the request includes an indicator of a predetermined time period during which authorization to perform the service from the user is received, and wherein the computer system transmits the electronic communication containing the authorization to perform the service for the user to the computing device of the offline service provider in response to receiving the authorization from the user within the predetermined time period.

4. The method of claim 1, wherein the computer system receives the request to link the account of the user on the Internet-based social network with the account of an offline service provider on the Internet-based online social network via an application programming interface.

5. The method of claim 1, wherein the electronic communication containing the notification that is provided to the computing device of the user includes one or more of: a mobile push notification, a text message, and an email.

6. The method of claim 1, wherein the electronic communication containing authorization to perform the service for the user includes one or more of: a mobile push notification, a text message, and an email.

7. The method of claim 1, wherein the method further comprises:
 controlling, by the computer system over the Internet, one or more of the user computing device and the offline service provider computing device to display an authorization dashboard that includes one or more of: a list of authorization requests that are awaiting the customer's approval, a list of authorization requests for which the customer has declined authorization, a list of authorization requests awaiting acknowledgment by the service provider, a list of expired authorization requests, and a list of revoked authorization requests.

8. The method of claim 1, wherein the electronic communication containing the notification that is provided to the computing device of the user includes a link to a website for authorizing the service by the user.

9. The method of claim 1, wherein the method further comprises:
 generating, in response to receiving the request for authorization from the service provider and the authorization from the user for the offline service provider to perform the service, a service agreement between the user and the offline service provider; and
 controlling, by the computer system over the Internet, one or more of the user computing device and the offline service provider computing device to display the service agreement.

10. A system comprising:
 a processor; and
 memory coupled to the processor and storing instructions that, when executed by the processor, cause the system to perform operations comprising:
  receiving, over the Internet from a computing device of a user of an Internet-based social network, an electronic communication containing a request to link an account of the user on the Internet-based social network with an account of an offline service provider on the Internet-based online social network;
  receiving, over the Internet from a computing device of the service provider, an electronic communication containing a request for authorization to perform a service for the user by the offline service provider, the request for authorization to perform a service for the user by the offline service provider including an expiration time after which a user will be unable to authorize the service;
  transmitting, over the Internet to the computing device of the user, an electronic communication containing a notification of the request for authorization, the notification of the request for authorization including a link that, when clicked, causes a graphical user interface operated by the user to navigate to an authorization web page operated by the offline service provider;

receiving, over the Internet from the computing device of the user, an electronic communication containing authorization from the user for the offline service provider to perform the service; and transmitting, over the Internet to the computing device of the offline service provider, an electronic communication containing authorization to perform the service for the user.

11. The system of claim 10, wherein the memory further stores instructions for causing the system to perform operations comprising:

receiving, over the Internet from the computing device of the offline service provider, an electronic communication containing an acknowledgment of the authorization to perform the service.

12. The system of claim 10, wherein the request includes an indicator of a predetermined time period during which authorization to perform the service from the user is received, and wherein the system transmits the electronic communication containing the authorization to perform the service for the user to the computing device of the offline service provider in response to receiving the authorization from the user within the predetermined time period.

13. The system of claim 10, wherein the system receives the request to link the account of the user on the Internet-based social network with the account of an offline service provider on the Internet-based online social network via an application programming interface.

14. The system of claim 10, wherein the electronic communication containing the notification that is provided to the computing device of the user includes one or more of: a mobile push notification, a text message, and an email.

15. The system of claim 10, wherein the electronic communication containing authorization to perform the service for the user includes one or more of: a mobile push notification, a text message, and an email.

16. The system of claim 10, wherein the memory further stores instructions for causing the system to perform operations comprising:

controlling, by the system over the Internet, one or more of the user computing device and the service provider computing device to display an authorization dashboard that includes one or more of: a list of authorization requests that are awaiting the customer's approval, a list of authorization requests for which the customer has declined authorization, a list of authorization requests awaiting acknowledgment by the service provider, a list of expired authorization requests, and a list of revoked authorization requests.

17. The system of claim 10, wherein the electronic communication containing the notification that is provided to the computing device of the user includes a link to a website for authorizing the service by the user.

18. The system of claim 10, wherein the memory further stores instructions for causing the system to perform operations comprising:

generating, in response to receiving the request for authorization from the offline service provider and the authorization from the user for the service provider to perform the service, a service agreement between the user and the offline service provider; and controlling, by the computer system over the Internet, one or more of the user computing device and the offline service provider computing device to display the service agreement.

19. A tangible, non-transitory computer-readable medium storing instructions that, when executed by a computer system, cause the computer system to perform operations comprising:

receiving, over the Internet from a computing device of a user of an Internet-based social network, an electronic communication containing a request to link an account of the user on the Internet-based social network with an account of an offline service provider on the Internet-based online social network;

receiving, over the Internet from a computing device of the offline service provider, an electronic communication containing a request for authorization to perform a service for the user by the offline service provider, the request for authorization to perform a service for the user by the offline service provider including an expiration time after which a user will be unable to authorize the service;

transmitting, over the Internet to the computing device of the user, an electronic communication containing a notification of the request for authorization, the notification of the request for authorization including a link that, when clicked, causes a graphical user interface operated by the user to navigate to an authorization web page operated by the offline service provider;

receiving, over the Internet from the computing device of the user, an electronic communication containing authorization from the user for the offline service provider to perform the service; and transmitting, over the Internet to the computing device of the offline service provider, an electronic communication containing authorization to perform the service for the user.

20. The computer-readable medium of claim 19, wherein the memory further stores instructions for causing the computer system to perform operations comprising:

controlling, by the computer system over the Internet, one or more of the user computing device and the offline service provider computing device to display an authorization dashboard that includes one or more of: a list of authorization requests that are awaiting the customer's approval, a list of authorization requests for which the customer has declined authorization, a list of authorization requests awaiting acknowledgment by the offline service provider, a list of expired authorization requests, and a list of revoked authorization requests.

* * * * *